(12) United States Patent
Tsuruta et al.

(10) Patent No.: US 10,094,698 B2
(45) Date of Patent: Oct. 9, 2018

(54) ELECTRODE-TYPE LIQUID LEVEL DETECTION DEVICE AND ELECTRODE-TYPE LIQUID LEVEL DETECTION METHOD

(71) Applicant: KABUSHIKI KAISHA TOSHIBA, Minato-ku (JP)

(72) Inventors: Satoru Tsuruta, Hachioji (JP); Tatsuo Kagifuku, Tama (JP); Isao Kohyama, Shibuya (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 138 days.

(21) Appl. No.: 15/037,589

(22) PCT Filed: Nov. 27, 2014

(86) PCT No.: PCT/JP2014/005934
§ 371 (c)(1),
(2) Date: May 18, 2016

(87) PCT Pub. No.: WO2015/083349
PCT Pub. Date: Jun. 11, 2015

(65) Prior Publication Data
US 2016/0290851 A1 Oct. 6, 2016

(30) Foreign Application Priority Data
Dec. 4, 2013 (JP) .................................. 2013-250950

(51) Int. Cl.
*G01F 19/00* (2006.01)
*G01F 25/00* (2006.01)
*G01F 23/24* (2006.01)

(52) U.S. Cl.
CPC .......... *G01F 25/0076* (2013.01); *G01F 23/24* (2013.01); *G01F 23/242* (2013.01); *G01F 23/243* (2013.01); *G01F 25/0061* (2013.01)

(58) Field of Classification Search
CPC ...... G01F 23/24; G01F 23/268; G01F 23/242; G01F 23/26; G01F 23/284
(Continued)

(56) References Cited

U.S. PATENT DOCUMENTS 4,789,946 A    12/1988  Sinz
6,148,666 A *  11/2000  Roesicke .............. G01F 23/266
                                                             340/620

(Continued)

FOREIGN PATENT DOCUMENTS

JP    58-114828 U    8/1983
JP    4-62433 A      2/1992
(Continued)

OTHER PUBLICATIONS

Office Action dated Mar. 14, 2017 in Japanese Patent Application No. 2013-250950 (with unedited computer generated English translation).
(Continued)

*Primary Examiner* — Eric S McCall
*Assistant Examiner* — Mohammed E Keramet-Amircola
(74) *Attorney, Agent, or Firm* — Oblon, McClelland, Maier & Neustadt, L.L.P.

(57) ABSTRACT

An electrode-type liquid level detection device comprises: an electrode unit in which at least two liquid level measurement electrodes, which are used to detect a liquid level, and a calibration electrode, which is not used to detect the liquid level, are integrated; a record unit that records a pre-use resistance value of each electrode of the electrode unit as initial resistance value; a calculation unit that calculates a
(Continued)

resistance value of a to-be-measured object based on the initial resistance value; and a control unit that controls in such a way as to adjust a threshold value for determining whether or not the to-be-measured object exists, based on a change in resistance values of the at least two liquid level measurement electrodes when in use. Therefore, the liquid level can be accurately detected corresponding to deterioration of the instrument.

5 Claims, 12 Drawing Sheets

(58) Field of Classification Search
USPC .................................. 73/1.73, 291, 304 R
See application file for complete search history.

(56) References Cited

U.S. PATENT DOCUMENTS

| | | | | |
|---|---|---|---|---|
| 6,634,229 | B1* | 10/2003 | Kazkaz | G01F 23/24 340/620 |
| 6,690,320 | B2* | 2/2004 | Benway | G01F 23/284 324/332 |
| 7,603,899 | B2* | 10/2009 | Li | G01F 23/263 73/304 C |
| 7,823,447 | B2* | 11/2010 | Harazin | G01F 23/266 73/304 R |
| 8,684,700 | B2* | 4/2014 | Carson-Rowland | G01F 23/242 417/36 |
| 2004/0261524 | A1* | 12/2004 | Chesk | G01F 23/24 73/304 R |
| 2005/0022595 | A1* | 2/2005 | Eguchi | B41J 2/14427 73/304 R |
| 2005/0097952 | A1* | 5/2005 | Steph | G01F 23/242 73/304 R |
| 2006/0021432 | A1* | 2/2006 | Salzmann | G01F 23/242 73/304 R |
| 2011/0303004 | A1* | 12/2011 | Carson-Rowland | G01F 23/24 73/304 R |
| 2013/0269431 | A1* | 10/2013 | Kawaguchi | G01F 23/22 73/304 R |

FOREIGN PATENT DOCUMENTS

| | | |
|---|---|---|
| JP | 7-229297 A | 8/1995 |
| JP | 8-247825 A | 9/1996 |
| JP | 8-285991 A | 11/1996 |
| JP | 9-287998 A | 11/1997 |
| JP | 9-325062 A | 12/1997 |
| JP | 2002-195867 A | 7/2002 |
| JP | 2003-149031 A | 5/2003 |
| JP | 2010-25464 A | 2/2010 |
| JP | 2011-237240 A | 11/2011 |
| WO | WO 2009/118402 A1 | 10/2009 |

OTHER PUBLICATIONS

Office Action dated May 9, 2017 in Japanese Application No. 2013-250950 (with unedited computer generated English translation).
Office Action dated Sep. 6, 2016 in Japanese Patent Application No. 2013-250950.
International Search Report dated Mar. 3, 2015 in PCT/JP14/005934 Filed Nov. 27, 2014.
Office Action dated Dec. 6, 2016 in Japanese Patent Application No. 2013-250950.

* cited by examiner

ELECTRODE-TYPE LIQUID LEVEL DETECTION DEVICE AND ELECTRODE-TYPE LIQUID LEVEL DETECTION METHOD

TECHNICAL FIELD

Embodiments of the present invention relate to an electrode-type liquid level detection device and electrode-type liquid level detection method for detecting liquid levels and the like using electrodes.

BACKGROUND ART

In general, an electrode-type water level detector is used for such purposes as determining water levels or detecting leakage of water.

FIG. 18 is a schematic diagram illustrating a conventional electrode-type water level detector. FIG. 19 is a circuit diagram illustrating the conventional electrode-type water level detector.

As illustrated in FIG. 18, the conventional electrode-type water level detector includes a first water level measurement electrode 2 and a second water level measurement electrode 3, which are insulated from each other, and a relay unit 4. A to-be-measured object 1 is a conductor that conducts electricity, such as water. When both the first water level measurement electrode 2 and the second water level measurement electrode 3 come in contact with the to-be-measured object 1, current flows between the first water level measurement electrode 2 and the second water level measurement electrode 3 via the to-be-measured object 1. The flow of the current through the relay unit 4 activates the relay unit 4, and whether or not the to-be-measured object 1 exists is detected as a result. In this case, the to-be-measured object 1 serves as an electrical resistor which connects the first water level measurement electrode 2 and the second water level measurement electrode 3.

As illustrated in FIG. 19, the relay unit 4 includes a threshold adjustment unit 6, a relay coil 7, and a relay switch 8. The threshold adjustment unit 6, the relay coil 7, and the relay switch 8 do not come in contact with the to-be-measured object 1, and are therefore more unlikely to corrode than the first water level measurement electrode 2 and the second water level measurement electrode 3. Accordingly, it is assumed that a change in the resistance value is small, and that there is no loss. Current (I) that flows through the circuit is expressed by the following formula (1):

$$I = V/(Z_{11} + Z_{12} + Z) \quad (1)$$

In the formula (1), $Z_{11}$ is a first resistance value representing the resistance of the first water level measurement electrode 2, $Z_{19}$ is a second resistance value representing the resistance of the second water level measurement electrode 3, and Z is a resistance value of the to-be-measured object 1, and V represents a voltage applied from a constant voltage source a.

When the current flowing through the relay coil 7 exceeds a relay operation threshold value, the relay switch 8 is activated. Then, it is determined that the first water level measurement electrode 2 and the second water level measurement electrode 3 are in contact with the to-be-measured object 1. In this case, the current or voltage flowing between the first water level measurement electrode 2 and the second water level measurement electrode 3 is measured by the threshold adjustment unit 6, and a threshold value of the resistance value of the to-be-measured object 1 is set as an invariant point. This enables the to-be-measured object 1 to be detected depending on the type or state of the to-be-measured object 1.

Among those that utilize such a detection method is a technique disclosed in Patent Document 1, for example. According to this technique, a water level measurement electrode is moved so that the level of water is continuously detected. When the level is not being measured, the water level measurement electrode is separated from the to-be-measured object, thereby preventing effects of the water level measurement electrode.

A technique disclosed in Patent Document 2 uses a conductive refractory to prevent current from going around into a furnace body. Moreover, the technique disclosed in Patent Document 2 corrects change of an electric resistance value of the conductive refractory by temperature to improve the sensitivity of detection.

As a similar detection method, there is a method of utilizing not voltage but capacitance in order to detect the water level. Among those that use this method is a technique disclosed in Patent Document 3, for example. This technique gets the frequency of AC voltage, which is used to measure capacitance, to change; a change in the dielectric constant of the to-be-measured object and insulating material is thereby calculated. Then, the measured change in the electrode capacitance is corrected with the dielectric constant of the insulating material and the dielectric constant of the medium, and the level is calculated. In this manner, a higher level of sensitivity is achieved.

PRIOR ART DOCUMENTS

Patent Documents

[Patent Document 1] Japanese Patent Application Laid-Open Publication No. H08-285991

[Patent Document 2] Japanese Patent Application Laid-Open Publication No. 2010-25464

[Patent Document 3] Japanese Patent Application Laid-Open Publication No. H09-287998

SUMMARY OF THE INVENTION

Problems to be Solved by the Invention

In the above-described conventional electrode-type water level detector, the relay operation threshold value is set as an invariant point. Accordingly, in the case of the conventional electrode-type water level detector, when a change in the resistance value Z of the to-be-measured object 1 (which will be referred to as a state change) has occurred due to a change in the temperature of the to-be-measured object 1 or fluctuations in the concentration of impurities, or when an increase in the resistance values ($Z_1$, $Z_2$) of the first water level measurement electrode 2 and second water level measurement electrode 3 has occurred due to measurement instruments that suffered deteriorations such as rust or corrosion, the current flowing through the circuit decreases as indicated by the formula (1).

As a result, the current flowing through the relay coil 7 decreases, and the relay operation threshold value is not satisfied. Even when the first water level measurement electrode 2 and the second water level measurement electrode 3 are in contact with the to-be-measured object 1, it is determined that the first water level measurement electrode 2 and the second water level measurement electrode 3 are not in contact with the to-be-measured object 1. Therefore, the problem is that whether or not the to-be-measured object 1 exists is not accurately detected.

The techniques disclosed in Patent Documents 1 to 3 fail to address the problem with the measurement instruments that suffered deteriorations such as corrosion of electrodes.

Embodiments of the present invention have been made in view of the above problems in order to solve these problems. The object is to provide an electrode-type liquid level detection device and electrode-type liquid level detection method that can accurately detect liquid levels by taking into account a state change of the to-be-measured object or the deterioration of measurement instruments.

Means for Solving the Problem

In order to achieve the above-mentioned object, according to an embodiment, there is provided an electrode-type liquid level detection device comprising: an electrode unit in which at least two liquid level measurement electrodes, which are used to detect a liquid level, and a calibration electrode, which is not used to detect the liquid level, are integrated; a record unit that records a pre-use resistance value of each electrode of the electrode unit as initial resistance value; a calculation unit that calculates a resistance value of a to-be-measured object based on the initial resistance value; and a control unit that controls in such a way as to adjust a threshold value for determining whether or not the to-be-measured object exists, based on a change in resistance values of the at least two liquid level measurement electrodes when in use.

Furthermore in order to achieve the above-mentioned object, according to an embodiment, there is provided an electrode-type liquid level detection device comprising: an electrode unit in which at least two liquid level measurement electrodes, which are used to detect a liquid level, are integrated; a record unit that records a pre-use resistance value of each electrode of the electrode unit as initial resistance value; a calculation unit that calculates a resistance value of a to-be-measured object based on the initial resistance value; and a control unit that controls in such a way as to adjust a threshold value for determining whether or not the to-be-measured object exists, based on the resistance value that changes according to a state change of the to-be-measured object.

In order to achieve the above-mentioned object, according to an embodiment, there is provided an electrode-type liquid level detection method for detecting a liquid level by using an electrode unit in which at least two liquid level measurement electrodes, which are used to detect the liquid level, and a calibration electrode, which is not used to detect the liquid level, are integrated, the method comprising: a record step of recording a pre-use resistance value of each electrode of the electrode unit as initial resistance value; a calculation step of calculating a resistance value of a to-be-measured object based on the initial resistance value; and a control step of controlling in such a way as to adjust a threshold value for determining whether or not the to-be-measured object exists, based on a change in resistance values of the at least two liquid level measurement electrodes when in use.

Furthermore in order to achieve the above-mentioned object, according to an embodiment, there is provided an electrode-type liquid level detection method for detecting a liquid level by using an electrode unit in which at least two liquid level measurement electrodes, which are used to detect the liquid level, are integrated, the method comprising: a record step of recording a pre-use resistance value of each electrode of the electrode unit as initial resistance value; a calculation step of calculating a resistance value of a to-be-measured object based on the initial resistance value; and a control step of controlling in such a way as to adjust a threshold value for determining whether or not the to-be-measured object exists, based on the resistance value that changes according to a state change of the to-be-measured object.

Advantage of the Invention

According to the embodiments, it is possible to accurately detect liquid levels by taking into account a state change of the to-be-measured object and the deterioration of measurement instruments.

EMBODIMENTS FOR CARRYING OUT THE INVENTION

Hereinafter, embodiments of an electrode-type water level detection device and electrode-type water level detection method will be described with reference to the accompanying drawings.

Electrode-type water level detection devices of embodiments described below will be installed on a wall surface of a tank or spent fuel pool at a nuclear power plant, for example. The electrode-type water level detection devices of embodiments described below recognize water as its to-be-measured object, in order to detect the leakage of water or the level of water.

First Embodiment

Configuration

Figure 1:
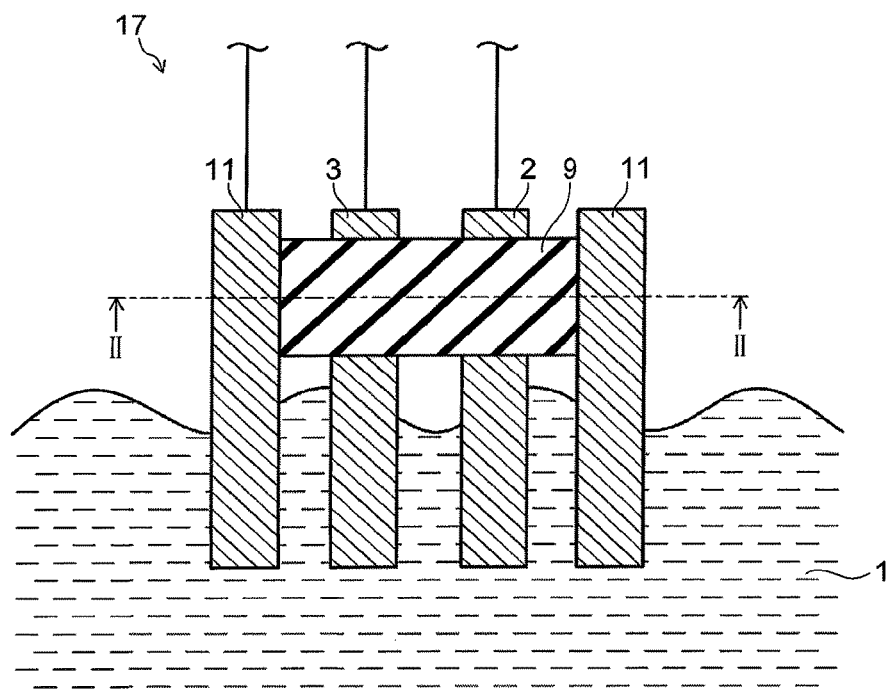
FIG. 1 is an elevational cross-sectional view illustrating an electrode-type water level detection device according to a first embodiment.
Figure 2:
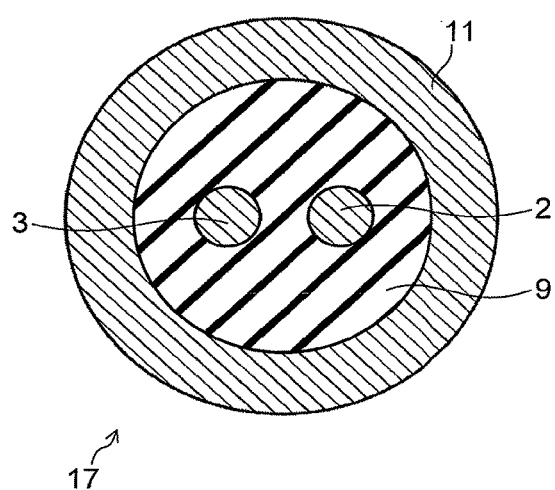
FIG. 2 is a cross-sectional view of FIG. 1 taken along line II-II.
Figure 3:
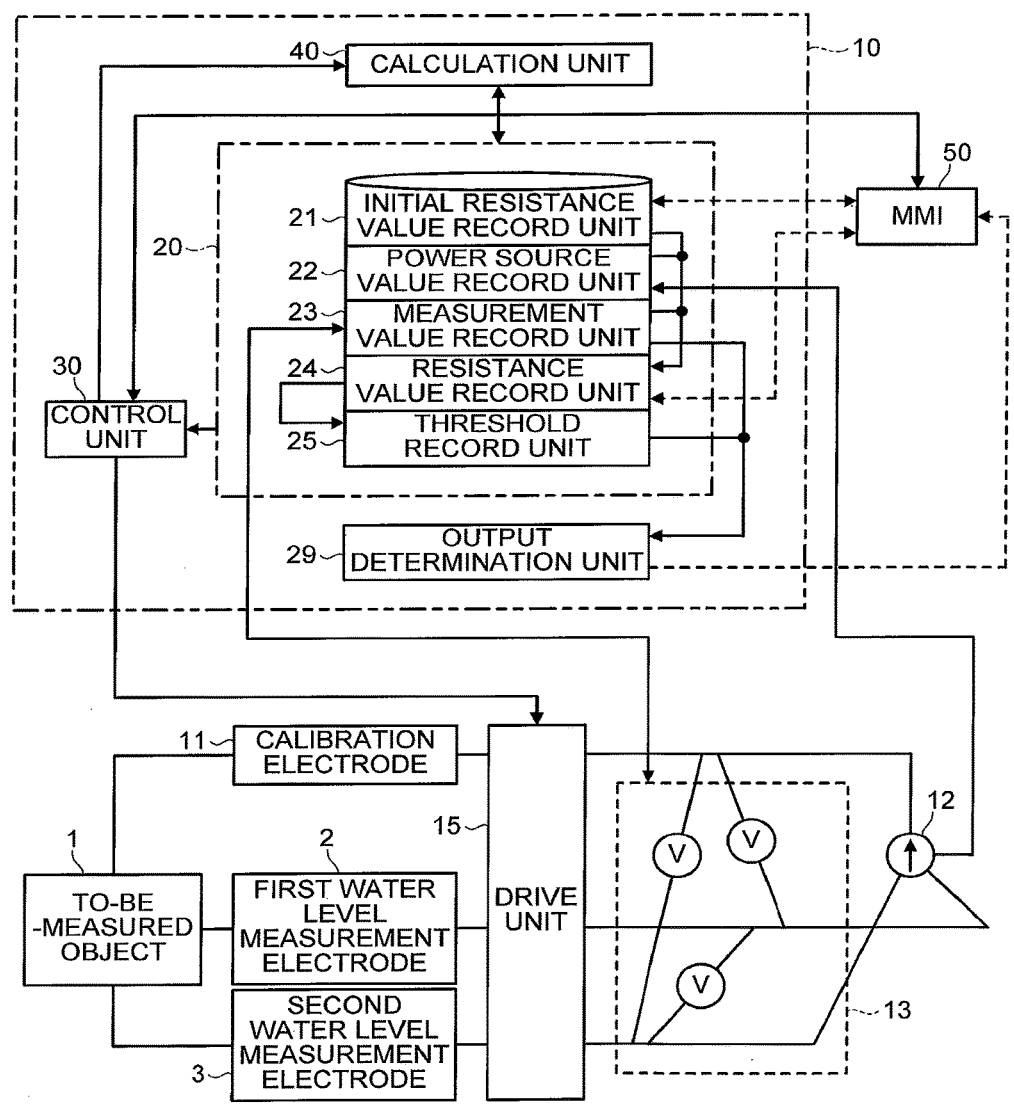
FIG. 3 is a block diagram illustrating a threshold change system of the electrode-type water level detection device according to the first embodiment.

FIG. 1 is an elevational cross-sectional view of an electrode-type water level detection device according to a first embodiment. FIG. 2 is a cross-sectional view of FIG. 1 taken along line II-II. FIG. 3 is a block diagram illustrating a threshold change system of the electrode-type water level detection device according to the first embodiment.

The portions that are the same as, or correspond to, those of the conventional configuration are represented by the same reference symbols. In FIG. 3, solid-line arrows indicate the flow of signals that are used to input respective values. Broken-line arrows represent the flow of signals that are used to display respective values. These arrows carry the same meaning even in FIGS. 9 and 17.

As illustrated in FIGS. 1 and 2, the electrode-type water level detection device of the present embodiment includes a first water level measurement electrode (first liquid level measurement electrode) 2, which has been formed into a rod shape; a second water level measurement electrode (second liquid level measurement electrode) 3, which has been similarly formed into a rod shape; and a calibration electrode 11, which has been formed into a hollow cylindrical shape. The tips (lower ends) of the first water level measurement electrode 2, the second water level measurement electrode 3, and the calibration electrode 11 extend to the same level. The first water level measurement electrode 2, the second water level measurement electrode 3, and the calibration electrode 11 are formed integrally as an electrode portion 17 via an insulator 9.

The first water level measurement electrode 2, the second water level measurement electrode 3, and the calibration electrode 11 are arranged at regular intervals in such a way as to be parallel to each other with respect to a length direction. The first water level measurement electrode 2 and the second water level measurement electrode 3 are surrounded by the calibration electrode 11.

The first water level measurement electrode 2 and the second water level measurement electrode 3 are usually used to detect the level of water. The first water level measurement electrode 2, the second water level measurement electrode 3, and the calibration electrode 11 allow current to flow through only their tip portions even the entire the first water level measurement electrode 2, the second water level measurement electrode 3, and the calibration electrode 11 are in contact with a to-be-measured object 1. The calibration electrode 11 is usually not used to detect the level of water.

As illustrated in FIG. 3, a power source 12 of the present embodiment is designed to get a constant current to flow between the first water level measurement electrode 2 and the second water level measurement electrode 3. In this case, instead of a constant current, a constant voltage may be applied. A measurement unit 13 measures a variable current, which flows between the first water level measurement electrode 2 and the second water level measurement electrode 3. A drive unit 15 has an electrode switch function, by which the first water level measurement electrode 2, the second water level measurement electrode 3, and the calibration electrode 11 are switched in a circuitry manner.

Control equipment 10 includes a record unit 20, an output determination unit 29, a control unit 30, and a calculation unit 40. The record unit 20 carries out the inputting and outputting of various kinds of data with a man machine interface (referred to as MMI) 50. The MMI 50 is an input and output device equipped with a keyboard, mouse, display, and the like. The control unit 30 receives commands from the MMI 50 and carries out various control operations within the control equipment 10, such as controlling the drive unit 15. The calculation unit 40 carries out various kinds of calculation using values recorded on the record unit 20 inside the control equipment 10.

The record unit 20 includes an initial resistance value record unit 21, a power source value record unit 22, a measurement value record unit 23, a resistance value record unit 24, and a threshold record unit 25. On the initial resistance value record unit 21, pre-use initial resistance values of the first water level measurement electrode 2, the second water level measurement electrode 3, and the calibration electrode 11 are recorded respectively as first initial resistance value $Z_1$, second initial resistance value $Z_2$, and third initial resistance value $Z_3$.

On the power source value record unit 22, an output value of the power source 12 is recorded as power source value I. On the measurement value record unit 23, first measurement value $V_1$, second measurement value $V_2$, and third measurement value $V_3$ are recorded. The first measurement value $V_1$ is a value of voltage being applied between the first water level measurement electrode 2 and the second water level measurement electrode 3, which is measured by the measurement unit 13. The second measurement value $V_2$ is a value of voltage being applied between the first water level measurement electrode 2 and the calibration electrode 11, which is measured by the measurement unit 13. The third measurement value $V_3$ is a value of voltage being applied between the second water level measurement electrode 3 and the calibration electrode 11, which is measured by the measurement unit 13.

On the resistance value record unit 24, first resistance value $Z_{11}$, second resistance value $Z_{12}$, and third resistance value $Z_{13}$ are recorded. The first resistance value $Z_{11}$ is a corrosion resistance of the first water level measurement electrode 2, which is calculated by the calculation unit 40. The second resistance value $Z_{12}$ is a corrosion resistance of the second water level measurement electrode 3, which is calculated by the calculation unit 40. The calibration electrode 11 rarely corrodes since current usually does not flow therethrough. Accordingly, the third resistance value $Z_{13}$ is set equal to the third initial resistance value $Z_3$ of the calibration electrode 11.

On the threshold record unit 25, a predetermined voltage value is recorded as threshold value Vs: As the first water level measurement electrode 2 and the second water level measurement electrode 3 come in contact with water, the voltage between the first water level measurement electrode 2 and the second water level measurement electrode 3 changes and becomes greater than or equal to the predetermined voltage value. That is, the threshold value Vs is a value for determining whether or not the to-be-measured object 1 exists.

The output determination unit 29 compares the first measurement value $V_1$, the second measurement value $V_9$, and the third measurement value $V_3$ recorded on the measurement value record unit 23 with the threshold value Vs, and makes a determination over the results.

Based on FIGS. 4 to 6, a switch-switching circuit of the electrode-type water level detection device of the present embodiment will be explained.

Figure 4:
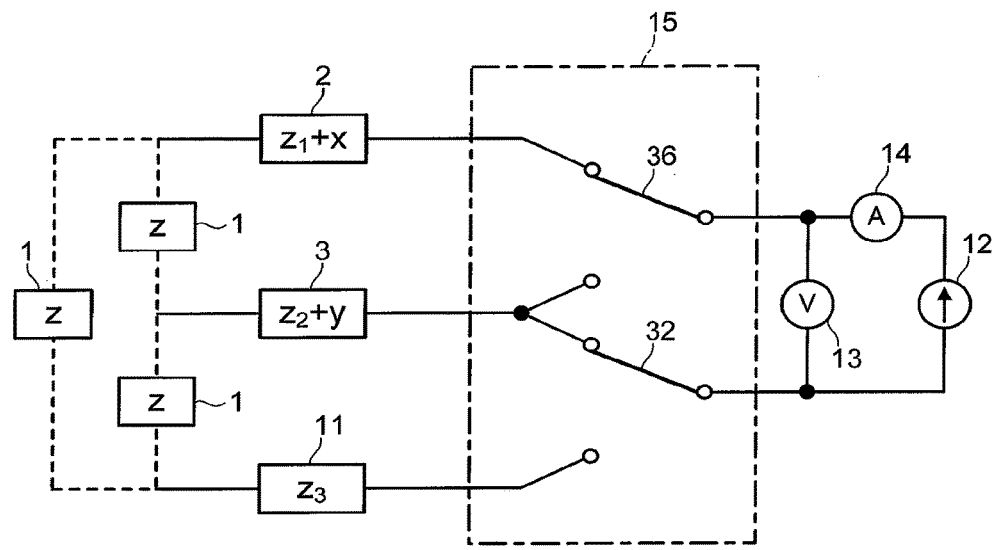
FIG. 4 is a switch-switching circuit diagram illustrating the electrode-type water level detection device of the first embodiment.

FIG. 4 is a switch-switching circuit diagram illustrating the electrode-type water level detection device of the first embodiment. FIG. 5 is a control circuit diagram illustrating a switch-switching circuit of the electrode-type water level detection device of the first embodiment. FIG. 6 is a timing chart illustrating operation of each of parts illustrated in FIGS. 4 and 5.

In FIG. 4, an ammeter 14 measures a value of current flowing through a switch-switching circuit of the electrode-type water level detection device. The drive unit 15 switches the first water level measurement electrode 2, the second water level measurement electrode 3, and the calibration electrode 11 in a circuitry manner. In the case of the present embodiment, a control circuit illustrated in FIG. 5 has been incorporated into the control unit 30 of the control equipment 10.

Figure 5:
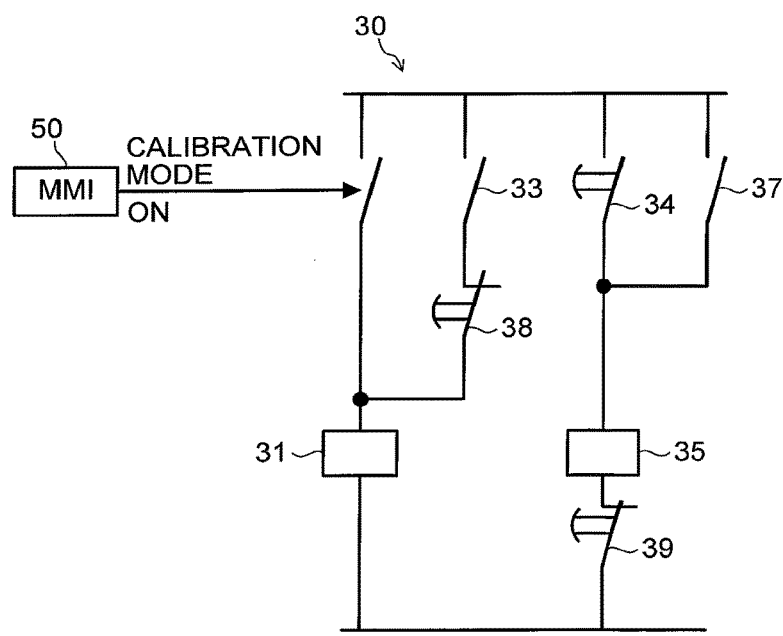
FIG. 5 is a control circuit diagram illustrating a switch-switching circuit of the electrode-type water level detection device of the first embodiment.
Figure 6:
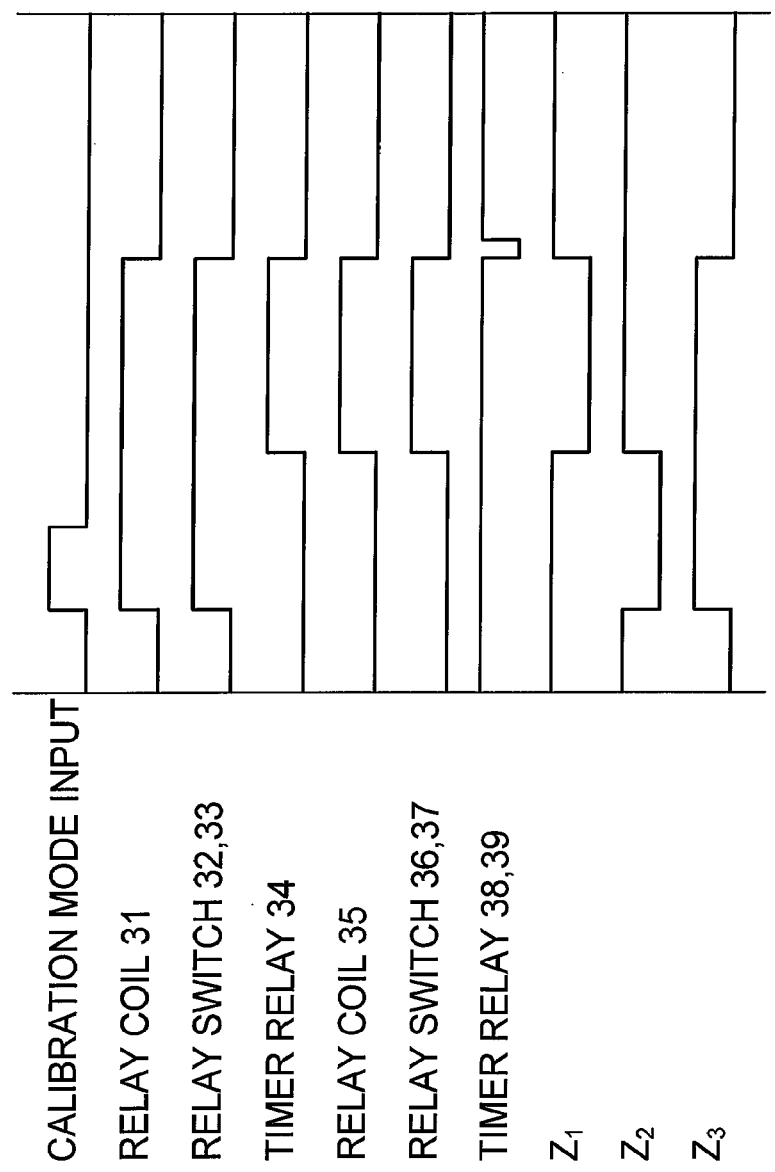
FIG. 6 is a timing chart illustrating operation of each of parts illustrated in FIGS. 4 and 5.

As illustrated in FIGS. 4 to 6, as a calibration mode activation signal is input from the MMI 50 to the control unit 30, a relay coil 31 becomes excited as current flows therethrough, and the relay switches 32 and 33 are turned on. That is, the relay switch 32, which is used to switch the second water level measurement electrode 3 and the calibration electrode 11 as illustrated in FIG. 4, and the current-holding relay switch 33 illustrated in FIG. 5 start to operate. As a result, the electrode that is used to detect the level of water is switched from the second water level measurement electrode 3 to the calibration electrode 11. Accordingly, as illustrated in FIG. 6, the second initial resistance value $Z_2$ is turned off, while the third initial resistance value $Z_3$ is turned on.

After a certain period of time has passed, a timer relay 34 is turned on. As current flows through a relay coil 35, a relay switch 36 illustrated in FIG. 4, which is used to switch the first water level measurement electrode 2 and the second water level measurement electrode 3, and a current-holding relay switch 37 illustrated in FIG. 5 start to operate. As a result, the electrode that is used to detect the level of water is switched from the first water level measurement electrode 2 to the second water level measurement electrode 3. Accordingly, as illustrated in FIG. 6, the first initial resistance value $Z_1$ is turned off, while the second initial resistance value $Z_2$ is turned on.

Furthermore, after a certain period of time has passed, timer relays 38 and 39 are turned off, thereby blocking current from flowing through the relay coils 31 and 35. As a result, the electrode that is used to detect the level of water returns to an initial state. During this process, the first initial resistance value $Z_1$ is turned on, while the third initial resistance value $Z_3$ is turned off. In this manner, the first water level measurement electrode 2, the second water level measurement electrode 3, and the calibration electrode 11 can be switched in a circuitry manner.

(Operation)

A first operation of the present embodiment will be explained.

First, as illustrated in FIG. 3, the voltage between the first water level measurement electrode 2 and the second water level measurement electrode 3 is measured by the measurement unit 13, and the result is recorded as first measurement value $V_1$ on the measurement value record unit 23. The result of a comparison between the first measurement value $V_1$ and threshold value Vs is assessed by the output determination unit 29. If the first measurement value $V_1$ is greater than threshold value Vs, the output determination unit 29 outputs to the MMI 50 a signal indicating that the to-be-measured object 1 is in contact.

At this time, as a correction function, the calculation unit 40 can calculate resistance value Z of the to-be-measured object 1 using the following formula, which is transformed from the formula (1), based on the initial resistance value of the first water level measurement electrode 2 that is recorded as the first initial resistance value $Z_1$; the initial resistance value of the second water level measurement electrode 3 that is recorded as the second initial resistance value $Z_2$; the output value of the power source 12 that is recorded as the power source value I; and the voltage between the first water level measurement electrode 2 and the second water level measurement electrode 3 that is recorded as the first measurement value $V_1$;

$$Z = V_1/I - Z_1 - Z_2 \qquad (2)$$

Substitute the first initial resistance value for $Z_1$, the second initial resistance value for $Z_9$, the power source value for I, and the first measurement value for $V_1$. The calculated resistance value Z of the to-be-measured object 1 is recorded as fourth resistance value $Z_4$ on the resistance value record unit 24. The first measurement value $V_1$ changes according to the fourth resistance value $Z_4$. The control unit 30 controls the threshold value Vs in such a way as to automatically increase or decrease the threshold value Vs depending on the change. Therefore, it is possible to automatically adjust the threshold value Vs depending on a change in the resistance caused by a state change of the to-be-measured object 1.

In the case of the present embodiment, as one example, the case where a current source is used as the power source 12 has been explained. The present invention is applicable even when the power source 12 is a voltage source and the first measurement value $V_1$ is of current.

A second operation of the present embodiment will be explained.

As illustrated in FIG. 3, current flows from the power source 12 to the first water level measurement electrode 2, the second water level measurement electrode 3, and the calibration electrode 11. The measurement unit 13 measures the voltages being applied to the entire circuit, in each combination circuit of electrodes formed by switching of switch circuits described above or the like. The voltages measured are recorded on the measurement value record unit 23 inside the control equipment 10 as first measurement value $V_1$, second measurement value $V_2$, and third measurement value $V_3$.

By the way, the first water level measurement electrode 2 and the second water level measurement electrode 3 suffer corrosion since current flows therethrough for a long time, resulting in a change in the resistance values of the first water level measurement electrode 2 and the second water level measurement electrode 3. Meanwhile, the calibration electrode 11 is unlikely to suffer corrosion because current usually does not flow therethrough as described above. Accordingly, the initial resistance value of the calibration electrode 11, which is recorded as the third initial resistance value $Z_3$ on the initial resistance value record unit 21, is used without being changed. Based on the formula (1), the following formulae (3), (4), and (5) are established:

$$V_1/I=(Z_1+x)(Z_2+y)+Z_4 \quad (3)$$

$$V_2/I=(Z_2+x)+Z_3+Z_4 \quad (4)$$

$$V_3/I=(Z_2+y)+Z_3+Z_4 \quad (5)$$

Here, $Z_1$ is the first initial resistance value, $Z_2$ is the second initial resistance value, $Z_3$ is the third initial resistance value, $Z_4$ is the fourth resistance value, $V_1$, $V_2$, and $V_3$ are respectively the first measurement value, the second measurement value, and the third measurement value, +x and +y are increased resistance values that are attributable to corrosion, and I is the power source value. The formulae (4) and (5) are transformed:

$$(Z_1+x)=V_2/I-Z_3-Z_4 \quad (6)$$

$$(Z_2+X)=V_3/I-Z_3-Z_4 \quad (7)$$

Substituting the formulae into the formula (3) generates the formula (8):

$$V_1/I = (V_2/I - Z_3 - Z_4) + (V_3/I - Z_3 - Z_4) + Z_4 = V_2/I + V_3/I - 2Z_3 - Z_4 \quad (8)$$

The formula (8) is transformed:

$$Z_4=(V_2+V_3-V_1)/I-2Z_3 \quad (9)$$

In this manner, the calculation unit 40 calculates resistance (fourth resistance value) $Z_4$ of the to-be-measured object 1. As the result is substituted into the formulae (6) and (7), corrosion resistance values of the first water level measurement electrode 2 and the second water level measurement electrode 3 are calculated. The corrosion resistance values are respectively recorded as the first resistance value $Z_{11}$ and the second resistance value $Z_{12}$ on the resistance value record unit 24.

Moreover, if the first resistance value $Z_{11}$ and the second resistance value $Z_{12}$ are reflected in the above-described first operation, a calibration effect of threshold adjustments associated with corrosion of the first water level measurement electrode 2 and the second water level measurement electrode 3 can be obtained.

Advantageous Effects

As described above, according to the present embodiment, the threshold value is automatically adjusted depending on a change in the resistance value caused by a state change of the to-be-measured object 1. Therefore, it is possible to avoid making a mistake in detecting whether or not the to-be-measured object 1 exists, even as the state of the to-be-measured object 1 changes.

Moreover, the calibration electrode 11 is used to measure the corrosion resistance of the first water level measurement electrode 2 and the second water level measurement electrode 3. Depending on a change in these resistance values, the threshold value is automatically adjusted. Therefore, it is possible to avoid making a mistake in detecting whether or not the to-be-measured object 1 exists, even as the electrodes suffer corrosion.

Modified Example of First Embodiment

Figure 7:
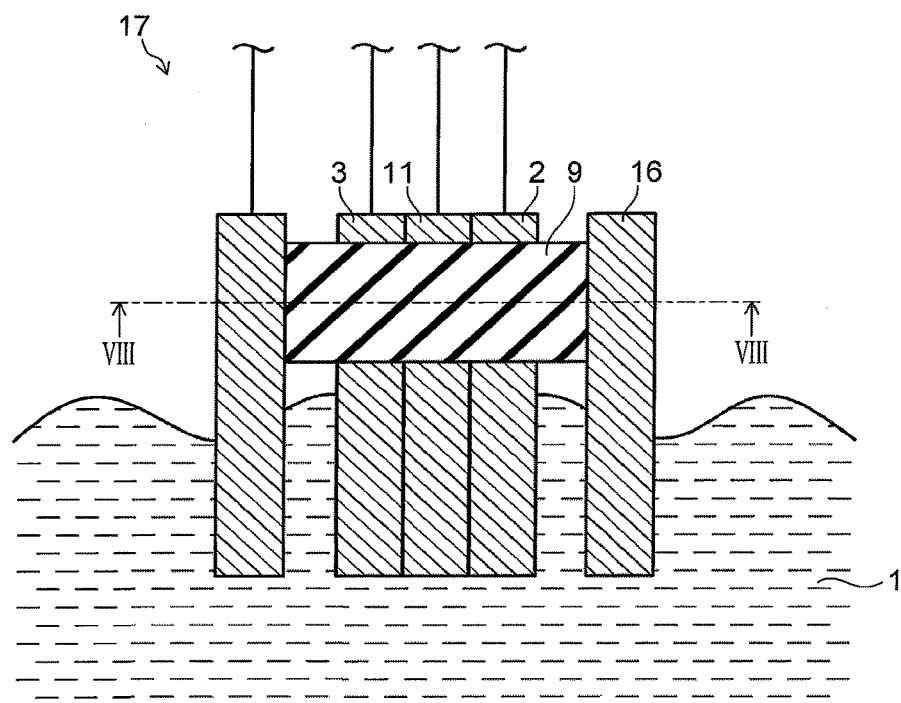
FIG. 7 is an elevational cross-sectional view illustrating a modified example of the electrode-type water level detection device of the first embodiment.
Figure 8:
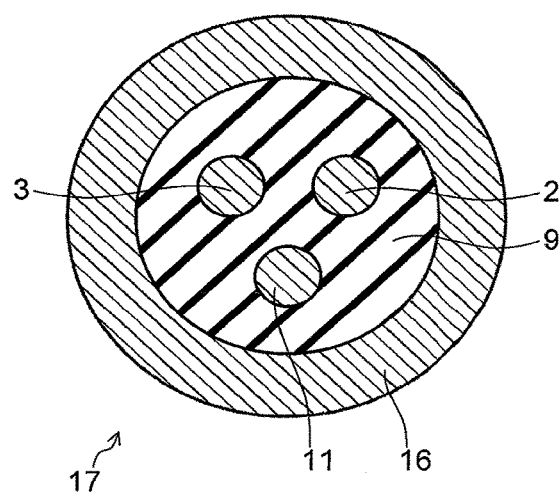
FIG. 8 is a cross-sectional view of FIG. 7 taken along VIII-VIII.

FIG. 7 is a schematic sectional elevational view illustrating a modified example of the electrode-type water level detection device of the first embodiment. FIG. 8 is a cross-sectional view of FIG. 7 taken along VIII-VIII. In this modified example, the portions that are the same as, or correspond to, those of the above-described first embodiment are represented by the same reference symbols, and only the configuration of different portions will be explained.

In the case of the above first embodiment, the calibration electrode 11 is formed into a cylindrical shape. In this modified example, like the first water level measurement electrode 2 and the second water level measurement electrode 3, the calibration electrode 11 is formed into a rod shape.

The calibration electrode 11, the first water level measurement electrode 2, and the second water level measurement electrode 3 are surrounded by a cylindrical body 16 in such a way that the calibration electrode 11, the first water level measurement electrode 2, and the second water level measurement electrode 3 are arranged parallel to each other and at certain intervals. The calibration electrode 11, the first water level measurement electrode 2, the second water level measurement electrode 3, and the cylindrical body 16 are electrically insulated from each other via insulator 9. The tip (lower end) portions of the calibration electrode 11, the first water level measurement electrode 2, the second water level measurement electrode 3, and the cylindrical body 16 extend to the same level.

In this manner, according to this modified example, the calibration electrode 11, the first water level measurement electrode 2, and the second water level measurement electrode 3 are surrounded by the cylindrical body 16. Therefore, the calibration electrode 11, the first water level measurement electrode 2, and the second water level measurement electrode 3 are protected.

Second Embodiment

Configuration

Figure 9:
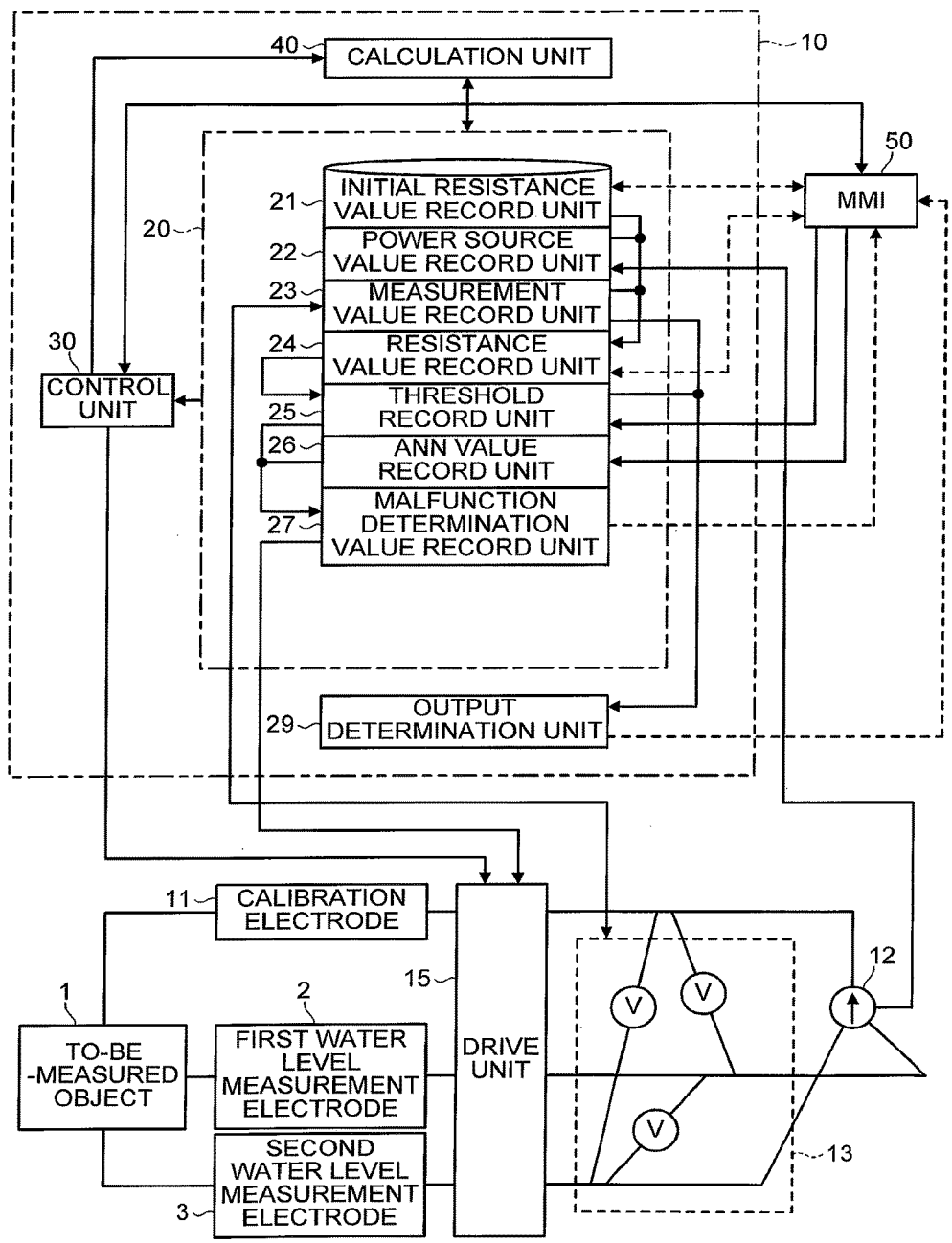
FIG. 9 is a block diagram illustrating an example in which replacement time is predicted in an electrode-type water level detection device according to a second embodiment.

FIG. 9 is a block diagram illustrating an example in which replacement time is predicted in an electrode-type water level detection device according to a second embodiment.

The present embodiment is a variant of the above-described first embodiment. The portions that are the same as, or correspond to, those of the first embodiment are represented by the same reference symbols and will not be explained repeatedly.

As illustrated in FIG. 9, in addition to the configuration of the first embodiment, the present embodiment includes, in the record unit 20, an ANN value (malfunction value) record unit 26 and a malfunction determination value record unit 27. Signals are output to the MMI 50 as data indicating the trend of electrode degradation; the signals represent the first initial resistance value $Z_1$, second initial resistance value $Z_2$ and third initial resistance value $Z_3$, which are recorded on the initial resistance value record unit 21 in the first embodiment, and the first resistance value $Z_{11}$, second resistance value $Z_{12}$ and third resistance value $Z_{13}$, which are recorded on the resistance value record unit 24.

The ANN value record unit 26 receives from the MMI 50 a threshold value at which the first water level measurement electrode 2 and the second water level measurement electrode 3 could yield a false detection, as an ANN value. Then, the ANN value record unit 26 records the ANN value. On the malfunction determination value record unit 27, a malfunction determination value is recorded to determine a water level undetectable state.

Based on FIGS. 10 to 13, a switch-switching circuit of the electrode-type water level detection device of the present embodiment will be explained.

Figure 10:
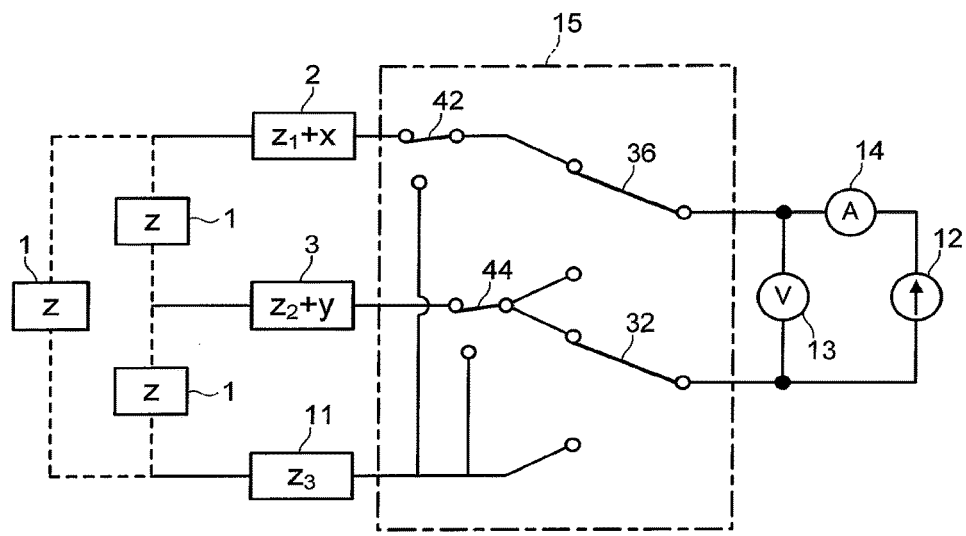
FIG. 10 is a switch-switching circuit diagram illustrating the electrode-type water level detection device of the second embodiment.
Figure 11:
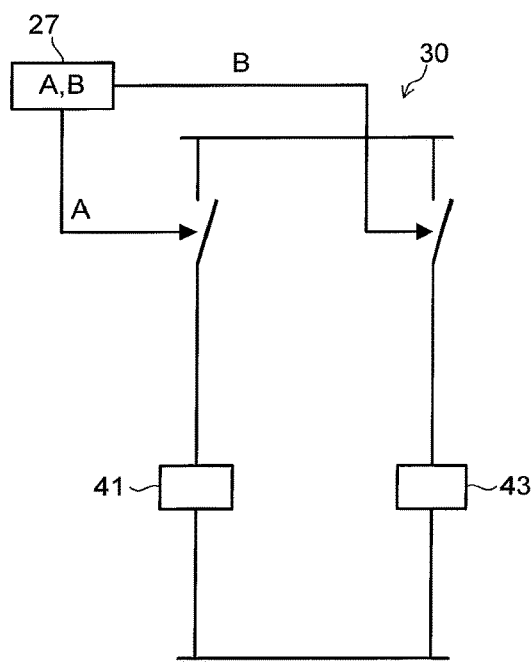
FIG. 11 is a control circuit diagram illustrating a switch-switching circuit of the electrode-type water level detection device of the second embodiment.
Figure 12:
FIG. 12 is a timing chart illustrating operation of each of parts illustrated in FIGS. 10 and 11 at the time of command A.
Figure 13:
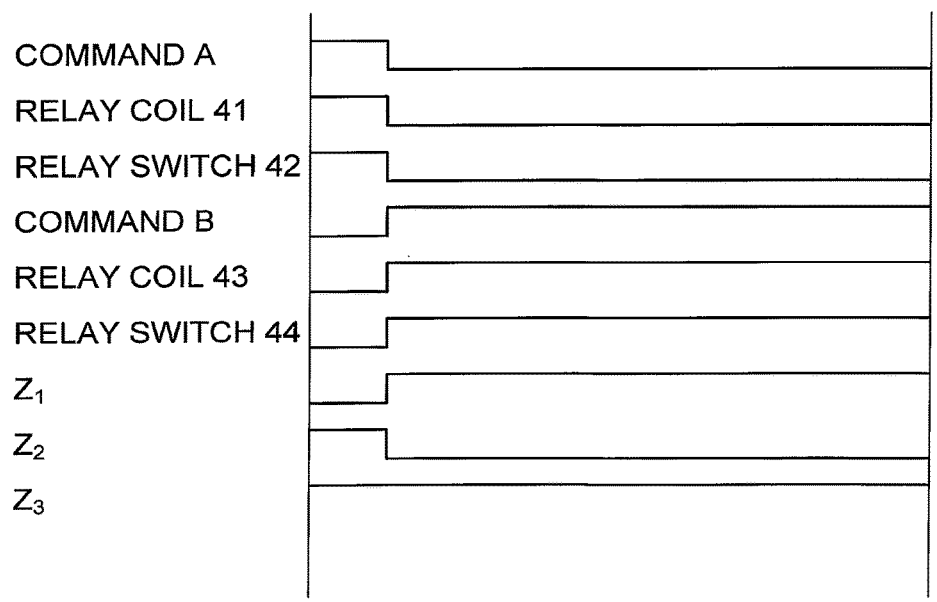
FIG. 13 is a timing chart illustrating operation of each of parts illustrated in FIGS. 10 and 11 when the command is switched from A to B.

FIG. 10 is a switch-switching circuit diagram illustrating the electrode-type water level detection device of the second embodiment. FIG. 11 is a control circuit diagram illustrating a switch-switching circuit of the electrode-type water level detection device of the second embodiment. FIG. 12 is a timing chart illustrating operation of each of parts illustrated in FIGS. 10 and 11 at the time of command A. FIG. 13 is a timing chart illustrating operation of each of parts illustrated in FIGS. 10 and 11 when the command is switched from A to B.

As illustrated in FIGS. 11 and 12, if a change in the resistance value of at least one of the first water level measurement electrode 2 and the second water level measurement electrode 3 exceeds the ANN value (malfunction value), the control unit 30 compares the change in the resistance value of the first water level measurement electrode 2 with that of the second water level measurement electrode 3. If the resistance-value change of the first water level measurement electrode 2 is greater than that of the second water level measurement electrode 3 (Condition A), a signal representing command A is sent from the malfunction determination value record unit 27 to the control unit 30.

After the signal representing command A is sent, current flows through a relay coil 41. Then, in the chive unit 15 illustrated in FIG. 10, a relay switch 42, which is used to switch the first water level measurement electrode 2 and the calibration electrode 11, starts to operate. Accordingly, the electrode to be used to detect the level of water is switched from the first water level measurement electrode 2 to the calibration electrode 11. As a result, as illustrated in FIG. 12, the first initial resistance value $Z_1$ is turned off, while the third initial resistance value $Z_3$ is turned on.

When the signal representing command A is being sent, the change in the resistance value of the second water level measurement electrode 3 could exceed that of the first water level measurement electrode 2 (Condition B). In such a case, as illustrated in FIG. 13, the signal representing command A is stopped, and a signal representing command B is instead sent.

After the signal representing command B is sent, as illustrated in FIG. 11, current stops flowing through the relay coil 41, while current flows through a relay coil 43. Then, the relay switch 42 is turned off, and a relay switch 44 is turned on.

That is, the relay switch 42, which is used to switch the first water level measurement electrode 2 and the calibration electrode 11, is switched, and the relay switch 44, which is used to switch the second water level measurement electrode 3 and the calibration electrode 11, is switched. As a result, the electrode to be used to detect the level of water is changed from the second water level measurement electrode 3 to the first water level measurement electrode 2. In this manner, as illustrated in FIG. 13, the second initial resistance value $Z_2$ is turned off, while the first initial resistance value $Z_1$ is turned on.

(Operation)

An operation of the present embodiment will be explained.

Measurement and calculation values are identical to those of the first embodiment, and therefore will not be explained repeatedly.

As illustrated in FIG. 9, a threshold value at which the first water level measurement electrode 2 and the second water level measurement electrode 3 yield a false detection is input from the MMI 50 to the ANN value (malfunction value) record unit 26 as a signal representing the ANN value. Then, the ANN value is compared with threshold-value trend data. In this manner, the time when the trend data of threshold value at which the first water level measurement electrode 2 and the second water level measurement electrode 3 yield a false detection reaches the ANN value is predicted, and a signal showing the result is sent to the malfunction determination value record unit 27. At the same time, the signal is output to the MMI 50 as a signal indicating a predicted malfunctioning time (replacement time).

Moreover, the drive unit 15 has a function of switching the first water level measurement electrode 2, the second water level measurement electrode 3, and the calibration electrode 11 in a circuitry fashion. The trend data of electrode degradation of the first resistance value $Z_{11}$ and second resistance value $Z_{12}$ is compared with the ANN value. The trend data of electrode degradation close to the ANN value indicates a serious corrosion state. Therefore, the control unit 30 adjusts the corrosion state by outputting to the drive unit 15 a signal for switching between the first water level measurement electrode 2 and the second water level measurement electrode 3.

Furthermore, based on the signal indicating a predicted malfunctioning time that is output from the malfunction determination value record unit 27, the first water level measurement electrode 2, the second water level measurement electrode 3, and the calibration electrode 11 are switched. In this manner, the detection function is maintained until the replacement time comes.

Therefore, in the case of the present embodiment, the threshold value at which the first water level measurement electrode 2, the second water level measurement electrode 3, and the calibration electrode 11 yield a false detection is recorded as an ANN value. The control unit 30 compares the ANN value with the trend data of the threshold value. When the threshold value exceeds the ANN value, a signal informing the MMI 50 of the replacement time is output. The MMI 50 displays a warning, through lamps, audio or the like.

Moreover, according to the present embodiment, the trend data of electrode degradation of the first resistance value $Z_{11}$ and second resistance value $Z_{12}$ is compared with the ANN value. The trend data of electrode degradation close to the ANN value indicates a serious corrosion state. Therefore, the control unit 30 outputs to the drive unit 15 a signal for switching between the first water level measurement electrode 2 and the second water level measurement electrode 3.

Advantageous Effects

According to the present embodiment, the trend of the change in the resistance values associated with corrosion is checked; a signal indicating the replacement time of the first water level measurement electrode 2, second water level measurement electrode 3, and calibration electrode 11 is automatically output. Therefore, the advantage is that it is possible to avoid an undetectable state of water level.

Moreover, according to the present embodiment, a signal for switching between the electrodes is output depending on the corrosion of the first water level measurement electrode 2, second water level measurement electrode 3, and calibration electrode 11. Therefore, it is possible to improve the service life of the electrodes, as well as to prevent an undetectable state.

Third Embodiment

Configuration

Figure 14:
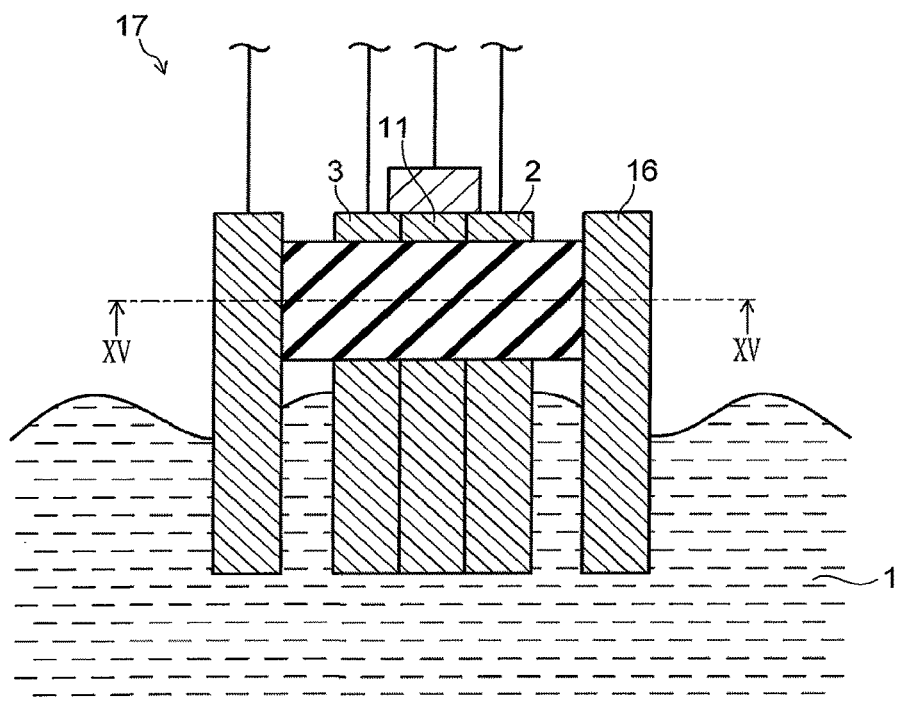
FIG. 14 is an elevational cross-sectional view illustrating an electrode-type water level detection device according to a third embodiment.
Figure 15:
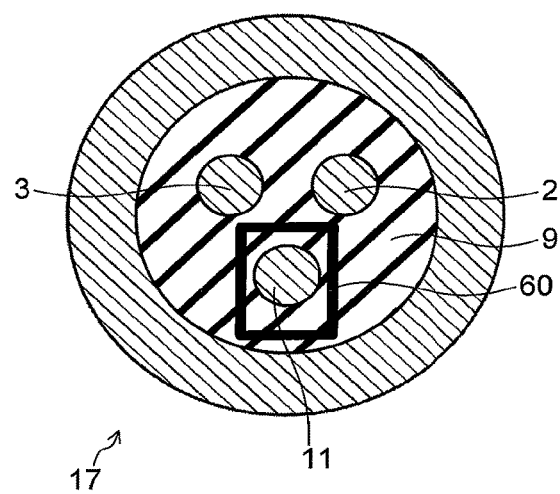
FIG. 15 is a cross-sectional view of FIG. 14 taken along XV-XV line.
Figure 16:
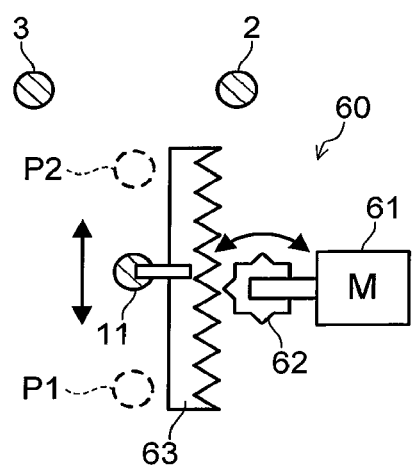
FIG. 16 is a schematic diagram illustrating a drive unit of FIG. 15 in detail.
Figure 17:
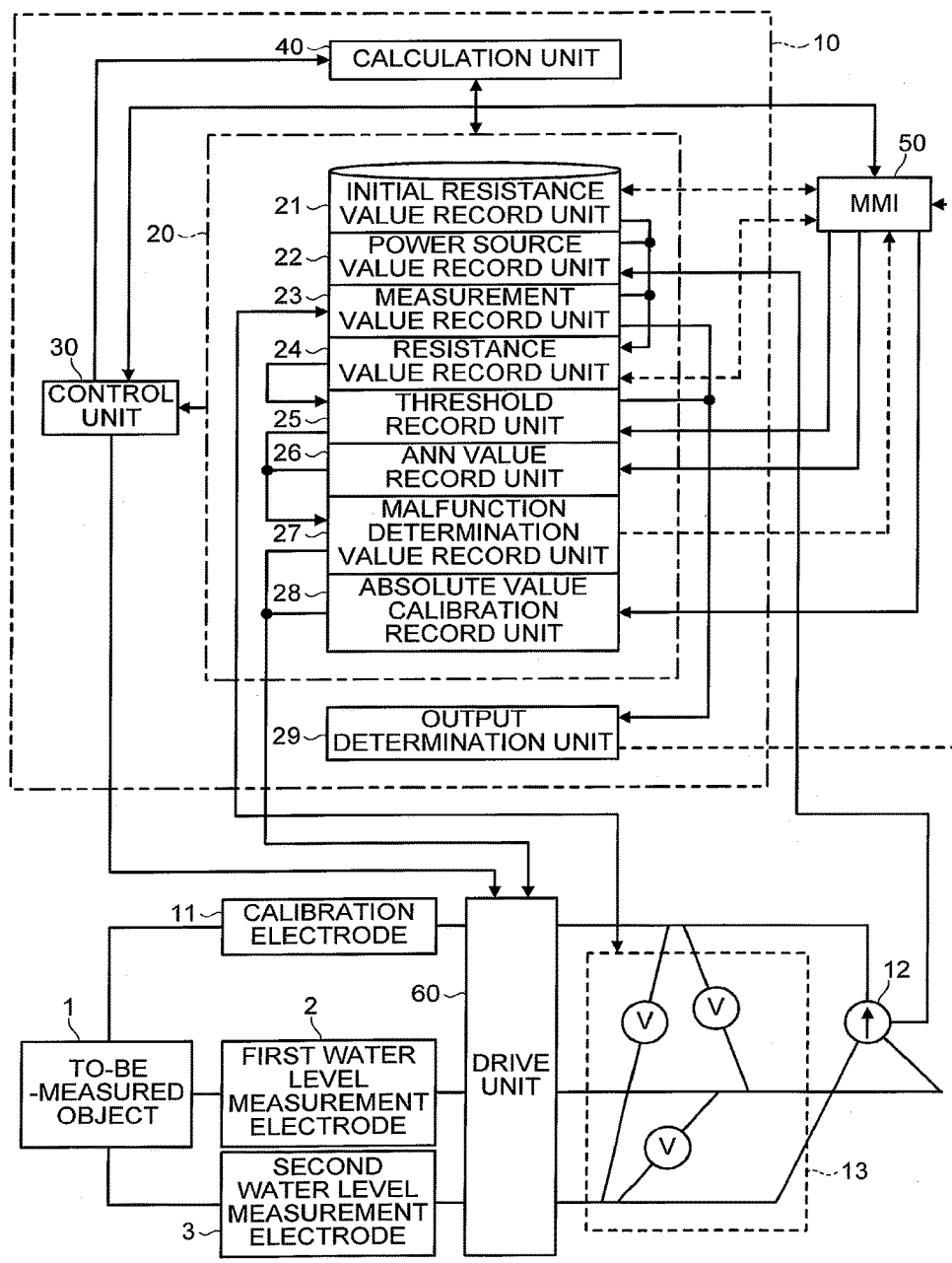
FIG. 17 is a block diagram illustrating an electrode drive system of the electrode-type water level detection device according to the third embodiment.
Figure 18:
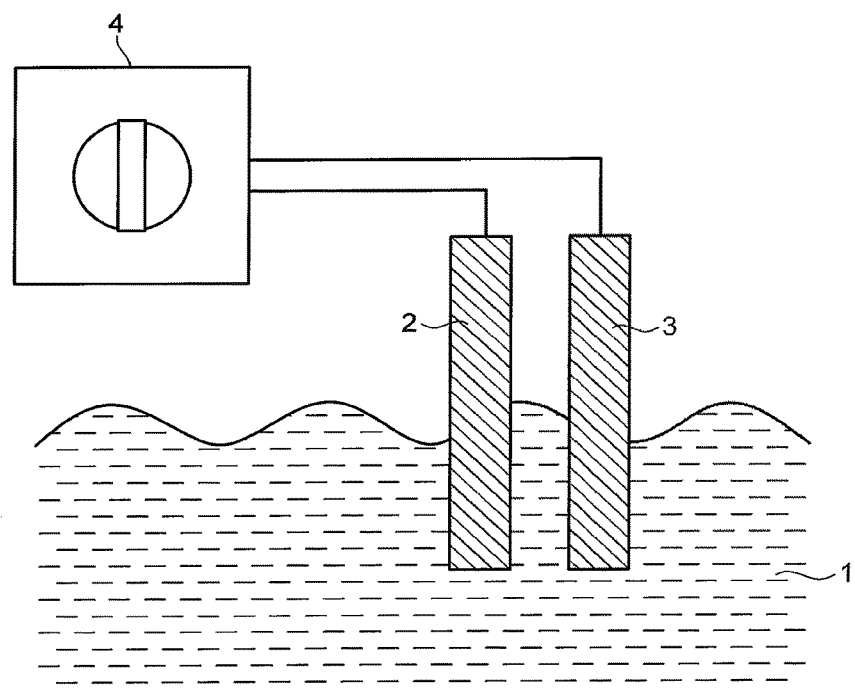
FIG. 18 is a schematic diagram illustrating a conventional electrode-type water level detector.
Figure 19:
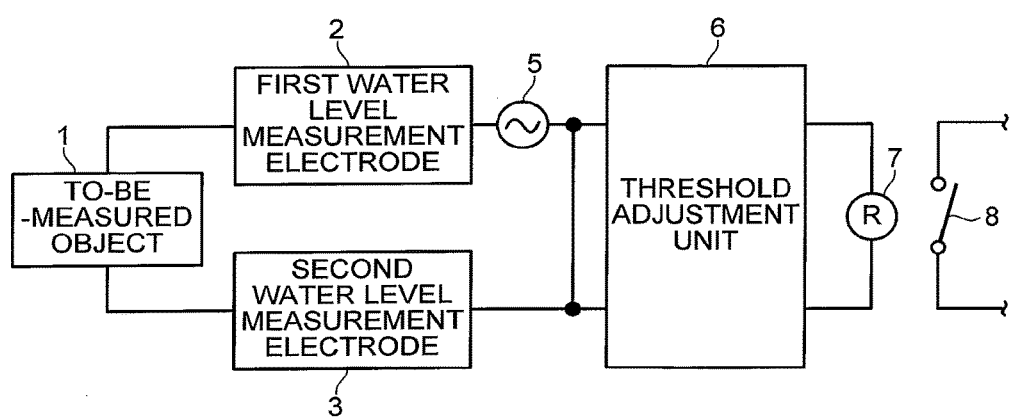
FIG. 19 is a circuit diagram illustrating the conventional electrode-type water level detector.

FIG. 14 is an elevational cross-sectional view illustrating an electrode-type water level detection device according to a third embodiment. FIG. 15 is a cross-sectional view of FIG. 14 taken along XV-XV line. FIG. 16 is a schematic diagram illustrating a drive unit of FIG. 15 in detail. FIG. 17 is a block diagram illustrating an electrode drive system of the electrode-type water level detection device according to the third embodiment.

The present embodiment is a variant of the above-described first embodiment. The same or corresponding portions are therefore represented by the same reference symbols, and will not be explained repeatedly.

In the case of the present embodiment, in addition to the configuration of the above-described first embodiment, a drive unit 60 is provided as a mechanism for moving the electrodes. More specifically, as illustrated in FIGS. 14 to 16, the drive unit 60 includes a motor 61, which functions as a drive source, a pinion gear 62, and a rack 63. The pinion gear 62 is attached to a rotation shaft of the motor 61, and is rotated in both forward and backward directions. The rack 63 meshes with the pinion gear 62. The calibration electrode 11 is fixed to the rack 63.

In the drive unit 60 thus configured, as the motor 61 is driven in forward direction, the pinion gear 62 is rotated. Then, the rack 63, which meshes with the pinion gear 62, is moved. As a result, the calibration electrode 11, which is fixed to the rack 63, moves in one direction. If the motor 61 is driven in backward direction, the calibration electrode 11 moves in opposite direction. In this manner, the calibration electrode 11 can move between first position P1 and second position P2. Accordingly, the distance between the calibration electrode 11 and the first water level measurement electrode 2, as well as the distance between the calibration electrode 11 and the second water level measurement electrode 3, can be changed.

Moreover, according to the present embodiment, as illustrated in FIG. 17, the record unit 20 includes an absolute value calibration record unit 28. On the absolute value calibration record unit 28, a current resistance value of the calibration electrode 11 is recorded.

(Operation)

The resistance value of the to-be-measured object 1 varies in proportion to the electrode-to-electrode distance. Therefore, when the electrode-to-electrode distance is changed by outputting to the drive unit 60 an input signal from the MMI 50 via the absolute value calibration record unit 28 and moving an electrode, the following simultaneous equations can be established:

$$V_{11}(Z_{14}+Z_{15}+\rho L)I \quad (10)$$

$$V_{12}(Z_{14}+Z_5+\rho(L+r))I \quad (11)$$

where $Z_{14}$ is the resistance value of the first water level measurement electrode 2; $Z_{15}$ is the resistance value of the second water level measurement electrode 3; $V_{11}$ represents the first measurement value before the movement; $V_{12}$ represents the second measurement value after the movement; I is the power source value; $\rho$ represents per-unit-length resistivity of the to-be-measured object ($\Omega$/m); L is the electrode-to-electrode distance before the movement; and r is the distance that the electrode has moved. Solve the simultaneous equations for $\rho$;

$$\rho=(V_{12}-V_{11})/rI \quad (12)$$

In this manner, regardless of the corrosion of the electrodes, the resistance value of the to-be-measured object 1 can be calculated.

In the above-described first embodiment, the calibration electrode 11 is explained as one that is unlikely to suffer corrosion. However, since the calibration electrode 11, too, is in touch with the to-be-measured object 1, the resistance value thereof would change somewhat.

By substituting the resistance of the to-be-measured object 1, calculated by the formula (12), into the formula (9), the corrosion resistance of the calibration electrode 11 can be calculated. The corrosion resistance of the calibration electrode 11 is recorded as third resistance value $Z_{13}$ on the resistance value record unit 24, and is used in the above-described first embodiment instead of the third initial resistance value $Z_3$. As a result, it is possible to calculate the absolute resistance value of each electrode at the time of measurement.

That is, in the above-described first embodiment, the third initial resistance value of the calibration electrode 11 is fixed as $Z_3$. However, during actual operation, the degradation of the calibration electrode 11 could occur. This means that the actual resistance value of the calibration electrode 11 may be different from the third initial resistance value $Z_3$, and that the calculated corrosion resistance (relative resistance) may be different from the actual value. The greater the variation width of the third resistance value $Z_{13}$ of the calibration electrode 11 becomes, the lower the reliability of the functionality of the above-described first embodiment will be.

According to the present embodiment, the resistance value of the to-be-measured object 1 is measured, and the current resistance value (absolute resistance value) of the third resistance value $Z_{13}$ of the calibration electrode 11 is calculated. As a result, it is possible to accurately calculate the resistance values of the other electrodes.

Advantageous Effects

As described above, according to the present embodiment, the distance of the calibration electrode 11 relative to the first water level measurement electrode 2 and the second water level measurement electrode 3 is changed. As a result, a change in the absolute resistance values of the electrodes and to-be-measured object 1, rather than relative ones, can be measured.

Other Embodiments

The embodiments of the present invention have been described above. Such embodiments have been presented by way of example and not intended to limit the scope of the invention. The new embodiments may be practiced in various other forms, and various omissions, substitutions, and modifications may be made without departing from the gist of the invention. Such embodiments and modifications are covered by the scope and gist of the invention, and embraced in the inventions set forth in the claims and the range of equivalency thereof.

For example, in each of the above-described embodiments, the to-be-measured object is water. However, the present invention is not limited to water. The present invention can be applied to other liquids as long as the liquids are conductive.

According to the first and second embodiments, the control circuit illustrated in FIG. 5 or 11 is embedded in the control unit 30. However, the present invention is not limited to this configuration. Another control circuit may be installed independently.

Furthermore, according to the above-described first and second embodiments, the first water level measurement electrode 2, the second water level measurement electrode 3, and the calibration electrode 11 are provided. However, the present invention is not limited to this. A greater number of electrodes may be provided.

EXPLANATION OF THE SYMBOLS

1: to-be-measured object
2: first water level measurement electrode
3: second water level measurement electrode
4: relay unit
5: constant voltage source
6: threshold adjustment unit
7: relay coil
8: relay switch
9: insulator
10: control equipment
11: calibration electrode
12: power source
13: measurement unit
14: ammeter
15: drive unit
16: cylindrical body
17: electrode portion
20: record unit
21: initial resistance value record unit
22: power source value record unit
23: measurement value record unit
24: resistance value record unit
25: threshold record unit
26: ANN value record unit
27: malfunction determination value record unit
28: absolute value calibration record unit
29: output determination unit
30: control unit
31: relay coil
32: relay switch
33: relay switch
34: timer relay
35: relay coil
36: relay switch
37: relay switch
38: timer relay
39: timer relay
40: calculation unit
41: relay coil
42: relay switch
43: relay coil
44: relay switch
50: MMI
60: drive unit
61: motor
63: rack
P1: first position
P2: second position
P3: third position
$V_1$: first measurement value
$V_2$: second measurement value
$V_3$: third measurement value
$V_{11}$: first value
$V_{12}$: second value
Vs: threshold value
$Z_1$: first initial resistance value
$Z_2$: second initial resistance value
$Z_3$: third initial resistance value
$Z_4$: fourth resistance value
$Z_{11}$: first resistance value
$Z_{12}$: second resistance value
$Z_{13}$: third resistance value
$Z_{14}$: resistance value of the first water level measurement electrode
$Z_{15}$: resistance value of the second water level measurement electrode

The invention claimed is:

1. An electrode-type liquid level detection device comprising:
an electrode unit including first and second liquid level measurement electrodes which are used to detect a liquid level, and a calibration electrode, which is not used to detect the liquid level but is used to calibrate the first and second liquid level measurement electrodes by flowing electric current therethrough during calibration;
a power source to supply current to the first and second liquid level measurement electrodes and the calibration electrode;
a switch drive unit for switching connection states among a measuring state in which current is supplied to the first and second liquid level measurement electrodes and the to-be-measured object connected in series with and between the first and second liquid level measurement electrodes, a first calibration state in which current is supplied to the first liquid level measurement electrode, the calibration electrode and the to-be-measured object connected in series with and between the first liquid level measurement electrode and the calibration electrode, and a second calibration state in which current is supplied to the second liquid level measurement electrode, the calibration electrode and the to-be-measured object connected in series with and between the second liquid level measurement electrode and the calibration electrode,
a record unit that records a pre-use resistance value of each electrode of the electrode unit as initial resistance value;
a calculation unit that calculates a resistance value of a to-be-measured object based on the initial resistance value;
an electrode drive unit that relatively moves one of the electrodes; and
a control unit that controls to adjust a threshold value for determining whether or not the to-be-measured object exists, wherein
the calculation unit is configured to calculate per-unit-length resistivity ρ of the to-be-measured object by following equation:

$$\rho = (V_{12} - V_{11})/(rI)$$

wherein $V_{11}$ represents a voltage over the first liquid level measurement electrode and the calibration electrode in the first calibration state after initiation of usage of the liquid level detection device and before relatively moving the one of the electrodes by the electrode drive unit, $V_{12}$ represents a voltage over the first liquid level measurement electrode and the calibration electrode in the first calibration state after relatively moving the one of the electrodes by the electrode drive unit, r represents a distance that the one of the electrodes has moved by the electrode drive unit, and I represents current supplied by the power source, the calculation unit is further configured to calculate an absolute resistance value of the to-be-measured object based on the per-unit-length resistivity, and absolute resistance values of the first and second liquid level measurement electrodes and the calibration electrode based on the absolute resistance value of the to-be-measured object, and the control unit is configured to adjust the threshold based on the absolute resistance values of the first and second liquid level measurement electrodes and the calibration electrode.

2. The electrode-type liquid level detection device according to claim 1, wherein
the first and second liquid level measurement electrodes and the calibration electrode are formed into rod shapes and are parallel to each other, and are surrounded by a hollow cylindrical body in which the electrodes are arranged at certain intervals.

3. The electrode-type liquid level detection device according to claim 1, wherein:
a threshold value at which the electrodes yield a false detection is recorded on the record unit as malfunction value data; the control unit compares the malfunction value data with threshold-value trend data of the electrodes; and, when the threshold-value trend data reaches the malfunction value, the control unit outputs a signal indicating a replacement time.

4. The electrode-type liquid level detection device according to claim 1, wherein
the control unit compares trend data of electrode degradation indicating a change in the resistance value of each of the electrodes with malfunction value data indicating a malfunction of each of the electrodes, and outputs a signal indicating need for replacement of an electrode whose trend data of electrode degradation reaches the malfunction value data.

5. An electrode-type liquid level detection method for detecting a liquid level by using an electrode unit including first and second liquid level measurement electrodes, which are used to detect the liquid level, and a calibration electrode, which is not used to detect the liquid level but is used to calibrate the first and second liquid level measurement electrodes by flowing electric current therethrough during calibration, the method comprising:
supplying current to the first and second liquid level measurement electrodes and the to-be-measured object connected in series with and between the first and second liquid level measurement electrodes, recording a pre-use resistance value of each electrode of the electrode unit as initial resistance value;

obtaining absolute resistance value of the to-be-measured object after use of the electrode unit based on the initial resistance value;

controlling to adjust a threshold value for determining whether or not the to-be-measured object exists, based on a change in resistance values of the first and second liquid level measurement electrodes when in use, wherein the obtaining absolute resistance value includes:
relatively moving the electrodes to change distances between the electrodes after usage of the electrode unit, supplying current to the first and second liquid level measurement electrodes and the to-be-measured object connected in series with and between the first and second liquid level measurement electrodes, before and after the moving, a first calibration of supplying current to the first liquid level measurement electrode and the calibration electrode, and the to-be-measured object connected in series with and between the first liquid level measurement electrode and the calibration electrode, before and after the moving, a second calibration of supplying current to the second liquid level measurement electrode and the calibration electrode, and the to-be-measured object connected in series with and between the second liquid level measurement electrode and the calibration electrode, before and after the moving, calculating, by a calculation unit, per-unit-length resistivity p of the to-be-measured object by following equation:

$\rho = (V_{12} - V_{11})/(rI)$ wherein $V_{11}$ represents a voltage over the first liquid level measurement electrode and the calibration electrode in the first calibration after initiation of usage of the liquid level detection device and before the moving, $V_{12}$ represents a voltage over the first liquid level measurement electrode and the calibration electrode in the first calibration after the moving, r represents a distance of moving in the moving, and I represents current supplied by a power source; and calculating, by the calculation unit, an absolute resistance value of the to-be-measured object based on the per-unit-length resistivity, and absolute resistance values of the first and second liquid level measurement electrodes and the calibration electrode based on the absolute resistance value of the to-be-measured object;

the controlling including:
adjusting the threshold based on the absolute resistance values of the first and second liquid level measurement electrodes and the calibration electrode.

* * * * *